(12) United States Patent
Saloni et al.

(10) Patent No.: US 11,856,428 B2
(45) Date of Patent: Dec. 26, 2023

(54) DETERMINING ANTENNA CONDITION (71) Applicant: Hewlett Packard Enterprise Development LP, Houston, TX (US)

(72) Inventors: Shubham Saloni, Santa Clara, CA (US); Myung Cheol Kim, Santa Clara, CA (US); Abhiruchi Dakshinkar, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 105 days.

(21) Appl. No.: 17/388,569

(22) Filed: Jul. 29, 2021

(65) Prior Publication Data
US 2023/0050564 A1 Feb. 16, 2023

(51) Int. Cl.
*H04W 24/08* (2009.01)
*H04B 17/318* (2015.01)

(52) U.S. Cl.
CPC .......... *H04W 24/08* (2013.01); *H04B 17/318* (2015.01)

(58) Field of Classification Search
CPC ...... H04B 17/26; H04B 17/202; H04W 24/08
See application file for complete search history.

(56) References Cited

U.S. PATENT DOCUMENTS

| 7,276,911 | B2 | 10/2007 | Frederick et al. | |
| 7,295,119 | B2 | 11/2007 | Rappaport et al. | |
| 9,742,481 | B1 * | 8/2017 | Jorgovanovic | H04B 7/082 |
| 9,930,430 | B2 | 3/2018 | Elder | |
| 10,694,399 | B1 | 6/2020 | Tran et al. | |
| 10,812,992 | B1 | 10/2020 | Tran et al. | |
| 2014/0233665 | A1 * | 8/2014 | Clevorn | H04B 7/061 |
| | | | | 375/267 |
| 2018/0027430 | A1 | 1/2018 | Pasulka et al. | |
| 2020/0059800 | A1 | 2/2020 | Menon et al. | |

FOREIGN PATENT DOCUMENTS

| CA | 3086565 | | 12/2020 | |
| EP | 2838210 | A1 * | 2/2015 | ............... H04B 1/40 |
| EP | 3208945 | | 8/2017 | |
| JP | 2012015975 | A * | 1/2012 | |
| WO | WO-2013087532 | A1 * | 6/2013 | ............. H04B 17/26 |
| WO | WO-2019219898 | A1 * | 11/2019 | ........... H04B 17/318 |
| WO | WO-20210007166 | | 1/2021 | |

\* cited by examiner

*Primary Examiner* — Kevin Kim
(74) *Attorney, Agent, or Firm* — Hewlett Packard Enterprise Patent Department (57) ABSTRACT

Examples described herein relate to an investigator device and a method for determining a condition of an antenna of an access point (AP). At least one investigator device may receive one or more antenna condition test frames transmitted via a plurality of antennas of the AP Further, the at least one investigator device may determine an average received signal strength indicator (RSSI) value corresponding to each of the plurality of antennas based on the one or more antenna condition test frames. A condition of the plurality of antennas of the AP may be determined based on a relative comparison between the average RSSI value corresponding to each of the plurality of antennas of the AP. Moreover, in some examples, the at least one investigator device may send a notification to an administrator of the AP based on the condition of the plurality of antennas.

17 Claims, 5 Drawing Sheets

DETERMINING ANTENNA CONDITION

BACKGROUND

In wireless communication devices, antennas play a useful role in transmitting and/or receiving data. For example, wireless communication devices, such as, access points (APs) generally use multiple transmit and receive antennas to improve transmission and reception data rates. Malfunctioning and/or damage to any of the transmitting and/or receiving antennas of an AP can lead to degradation of the performance of the AP and the performance of a network in which the AP is operating.

BRIEF DESCRIPTION OF THE DRAWINGS

One or more examples in the present disclosure are described in detail with reference to the following figures. The figures are provided for purposes of illustration only and merely depict typical or examples.

The figures are not exhaustive and do not limit the present disclosure to the precise form disclosed.

DETAILED DESCRIPTION

Wireless communication devices, for example, some access points (APs) use multiple-input and multiple-output (MIMO) technology for transmitting and receiving data. In particular, the MIMO technology entails the use of multiple transmit and receive antennas to improve the transmission and reception data rates. Support for the MIMO technology was introduced in the 802.11n standard for wireless local area network (WLAN) communications. The 802.11 n and successive standards, such as the 802.11ac and 802.11ax use the MIMO technology to facilitate functionalities, such as, but not limited to, transmit beamforming, downlink multi-user MIMO (DL MU-MIMO), uplink multi-user MIMO (UL MU-MIMO), etc.

Currently available APs supporting the 802.11n and the successive standards (e.g., 802.11ac and 802.11ax) generally uses multiple transmit and receive antennas, for example, up to 8 antennas. The antennas employed in an AP may be classified as internal antennas or external antennas depending on their mounting locations. The internal antennas are the ones that are mounted within a housing of the AP and hence may not be visible, whereas the external antennas are typically mounted on the housing and are visible.

In some instances, during installation, operation, or sometimes due to manufacturing issues, one or more antennas in an AP may get broken, become loose, or get disconnected from a circuit board of the AP causing the antennas to malfunction or become inoperable. Given the role played by the antennas in the functioning of an AP, such a defective antenna can hamper the performance of the AP and hence the performance of a network in which the AP is deployed. In particular, in some instances, such issues may cause the AP to underperform. Further, as the number of antennas used in APs is increasing due to the use of the MIMO technology, the APs may become more susceptible to antenna problems. Sometimes, such antenna-related issues may be difficult to detect, debug, and/or fix. More particularly, it may be challenging to detect the internal antennas that are defective. Moreover, in some instances, an external antenna that aesthetically appears in good condition may as well have loose internal electrical contacts causing the external antenna to malfunction. Such problems may occur in small-scale set-ups, such as, networks having single AP (e.g., typical home networks) or in medium or large-scale set-ups having several APs deployments (e.g., enterprise networks).

In the present disclosure, example techniques to detect defective antenna(s) in a wireless communication device, for example, an AP, are proposed. The wireless communication device having the defective antenna(s) may be identified using the proposed techniques, so that such wireless communication device may later be repaired or replaced to revive the lost performance of the wireless communication device and the performance of the network in which the wireless communication device is operating. These improvements may be utilized at the access point or any other suitable location within the network.

In accordance with some examples, to aid in the detection of the defective antenna(s), an AP (e.g., a wireless communication device whose antennas are to be tested) may be configured to transmit one or more antenna condition test frames to at least one investigator device. The investigator device may be another AP in a network, or a client device connected to the AP transmitting the antenna condition test frames. The antenna condition test frames include the identity of the transmitting antenna. The antenna condition test frames may be broadcast frames such as vendor-specific action frames that may be transmitted by the AP using a single antenna at a time. The AP may iterate through all the antennas to transmit these antenna condition test frames to the at least one investigator device.

The investigator device may receive the antenna condition test frames and determine the condition of the antennas of the AP based on the received antenna condition test frames. For instance, if a given transmitting antenna of the AP is defective, the investigator device may receive the antenna condition test frames transmitted by the given antenna with a reduced received signal strength indicator (RSSI) value compared to other healthy (i.e., normally operating) antennas and this is how the malfunctioning antenna would be detected. In particular, in some examples, the investigator device may determine an average RSSI value corresponding to each of the plurality of antennas of the AP based on the antenna condition test frames. Further, in some examples, the investigator device may perform an antenna condition test to determine a condition of the plurality of antennas of the AP based on a relative comparison between the average RSSI value corresponding to each of the plurality of antennas of the AP.

As will be appreciated, the proposed examples may facilitate the identification of defective antennas in wireless communication devices such as APs. As a result, corrective actions such as repairing or replacing the respective APs may be performed and the performance of the network in which the APs are operating may be improved. Further, in some examples, more than one investigator device may be assigned for a given AP to determine antenna conditions of the given AP. In some cases, the use of multiple investigator devices may facilitate redundancy and may ensure that an antenna condition test may not be impacted in case any investigator device fails or does not work. In certain cases, use of the multiple investigator devices may enhance the accuracy of determining antenna conditions. Further, in some implementations, the investigator device may be configured to receive the antenna condition test frames via multiple receiving antennas at the investigator device. Consequently, the proposed examples may even work in case even the investigator device has some defective antennas. The impact of defective receiving antennas may be reflected on determined average RSSI values of all antenna test condition frames received from an AP However, as the determination of the antenna condition is based on the relative comparison between the average RSSI values for decision making, the impact of the defective antennas at the investigator device may be negated, fully or partially. The proposed example methods may be implemented in wireless communication devices such as APs and controllers which aids in quick debugging of the network issues.

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Figure 1:
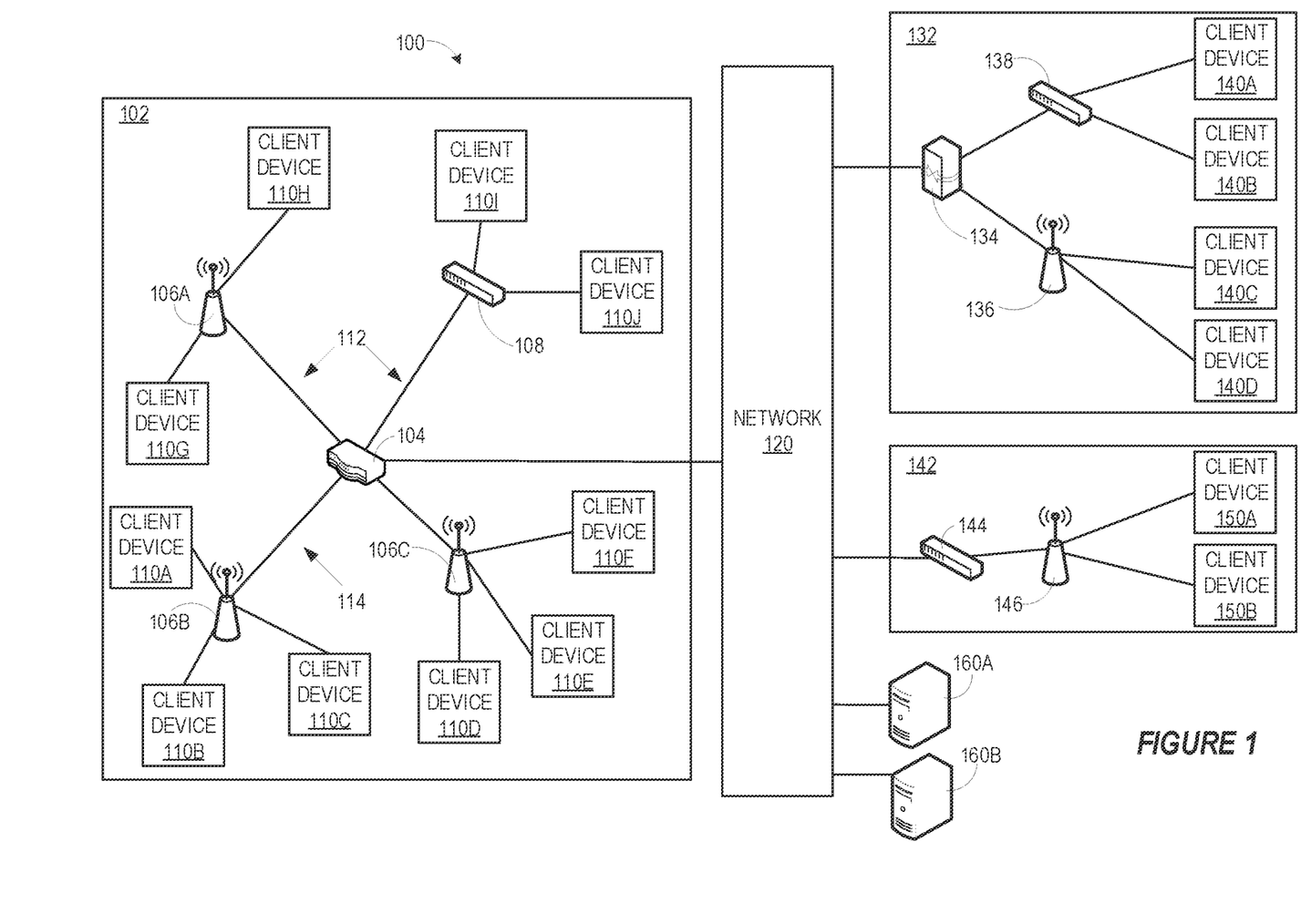
FIG. 1 illustrates an example network configuration in which various of the examples presented herein may be implemented.

Before describing examples of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility, or other organization. This diagram illustrates an example of a configuration implemented with an organization having multiple users (or at least multiple client devices 110) and possibly one or more physical or geographical sites, for example, a primary site 102, and/or remote sites 132, 142. The primary site 102 and/or the remote sites 132, 142 are in communication with a network 120.

The primary site 102 may include a primary network, which can be, for example, an office network, home network, or other network installation. The primary site 102 may be a private network, such as a network that may include security and access controls to restrict access to authorized users of the private network. Authorized users may include, for example, employees of a company at the primary site 102, residents of a house, customers at a business, and so on. In the illustrated example, the primary site 102 is shown to include a controller 104 in communication with the network 120. The controller 104 may provide communication with the network 120 for the primary site 102, though it may not be the only point of communication with the network 120 for the primary site 102. A single controller 104 is illustrated, though the primary site 102 may include multiple controllers and/or multiple communication points with network 120. In some examples, the controller 104 may communicate with the network 120 through a router (not shown). In other implementations, the controller 104 may provide router functionality to the devices in the primary site 102.

The controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point. In some examples, the controller 104 may be in communication with one or more switches 108 and/or wireless Access Points (APs) 106A-106C. The switches 108 and the wireless APs 106A-106C may provide network connectivity to various client devices 110A-110J. Using a connection to the switch 108 or one or more of the AP 106A-106C, one or more of the client devices 110A-110J may access network resources; including other devices on the (primary site 102) network and the network 120. Examples of client devices 110A-110J may include, but are not limited to; desktop computers, laptop computers, servers, web servers; authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers; mainframes; tablet computers, e-readers; netbook computers, televisions and similar monitors (e.g., smart TVs), content receivers, set-top boxes, personal digital assistants (PDAs), mobile phones, smartphones, smart terminals, dumb terminals; virtual terminals, video game consoles, virtual assistants; Internet of Things (IoT) devices; and the like.

Within the primary site 102, the switch 108 is included as one example of a point of access to the network established in primary site 102 for wired client devices 110I and 110J, for example. The client devices 110I and 110J may connect to the switch 108 and through the switch 108, may be able to access other devices within the network configuration 100. The client devices 110I and 110J may also be able to access the network 120, through the switch 108. The client devices 110I and 110J may communicate with the switch 108 over a wired connection 112. In the illustrated example, the switch 108 may communicate with the controller 104 over a wired connection 112, though this connection may also be wireless, in some examples.

The wireless APs 106A-106C are included as another example of a point of access to the network established in primary site 102 for client devices 110A-110H. Each of APs 106A-106C may be a combination of hardware, software; and/or firmware that is configured to provide wireless network connectivity to wireless client devices 110A-110H. In the illustrated example, the APs 106A-106C can be managed and configured by the controller 104. The APs 106A-106C may communicate with the controller 104 and the network 120 over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, the remote site 132 may utilize a connection over a different network, e.g., the network 120. The remote site 132 such as the one illustrated in FIG. 1 may be, for example, a satellite office, another floor, or suite in a building, and so on. The remote site 132 may include a gateway device 134 for communicating with the network 120. The gateway device 134 may be a router, a digital-to-analog modem, a cable modem, a Digital Subscriber Line (DSL) modem, or some other network device configured to communicate to the network 120. The remote site 132 may also include a switch 138 and/or an AP 136 in communication with the gateway device 134 over either wired or wireless connections. The switch 138 and the AP 136 may provide connectivity to the network for various client devices 140A-140D.

In various examples described herein, the remote site 132 may be in direct communication with the primary site 102, such that client devices 140A-140D at the remote site 132 access the network resources at the primary site 102 as if these client devices 140A-140D were located at the primary site 102. In such examples, the remote site 132 may be managed by the controller 104 at the primary site 102, and the controller 104 may provide the necessary connectivity, security, and accessibility that enable the remote site 132's communication with the primary site 102. Once connected to the primary site 102, the remote site 132 may function as a part of a private network provided by the primary site 102.

In various examples, the network configuration 100 may include one or more smaller remote sites 142, comprising a gateway device 144 for communicating with the network 120 and a wireless AP 146, by which various client devices 150A, 150B access the network 120. Such a remote site 142 may represent, for example, an individual employee's home or a temporary remote office. The remote site 142 may also be in communication with the primary site 102, such that the client devices 150A, 150B at remote site 142 access the network resources at the primary site 102 as if these client devices 150A, 1508 were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or another communication network to allow connectivity among the various sites 102, 132 to 142 as well as access to content servers 160A, 1608. The network 120 may include third-party telecommunication lines, such as phone lines, broadcast coaxial cable, fiber optic cables, satellite communications, cellular communications, and the Ike. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The content servers 160A, 1608 may be part of the network 120 or disposed outside of the network 120. The content servers 160A, 160B may include various providers of multimedia downloadable and/or streaming content, including audio, video, graphical, and/or text content, or any combination thereof. Examples of content servers 160A, 160B may include, but are not limited to, web servers, streaming radio and video providers, and cable and satellite television providers. The client devices 110A-110J, 140A-140D, 150A-1508 may request and access the multimedia content provided by the content servers 160A, 160B.

In the network configuration 100 of FIG. 1, it may happen that an AP of the APs 106A-106C, the AP 136, or the AP 146, may have a defective antenna(s). The term defective antenna as used herein may refer to a broken, loose, malfunctioning, and/or any abnormally behaving antenna causing the performance of the AP to degrade. In accordance with aspects of the present disclosure, example methods for detection of such defective antennas are presented. For a given AP whose antennas are to be tested, at least one device (e.g., an AP or a client device) may be nominated as an investigator device. In certain examples, the controller 104 may notify one or more APs or one or more client devices a list of APs for which the one or more APs or the one or more client devices are nominated as investigator devices.

In some examples, for a site having multiple APs, such as the primary site 102, a plurality of APs that are communicatively coupled to a given AP over a common channel frequency may be nominated as investigator devices for the given AP In particular, one or more APs whose beacons are received by the given AP may be nominated as the investigator devices for the given AP For example, in the primary site 102, for the AP 106A whose antennas are to be tested, the APs 106B and 106C may be nominated as investigator devices. In some other example, for a site having a single AP, such as, the remote site 132, any of the client devices 140A-140D that are communicatively coupled to the AP 136 may be nominated as an investigator device for the AP 136. In particular, in some examples, one or more client devices that receive beacons transmitted by the AP 136 may be nominated as investigator devices for the AP 136. Similarly, in the remote site 142, any of the client devices 150A-1503 that are communicatively coupled to the AP 146 may be nominated as an investigator device for the AP 146.

In some examples, to aid in the detection of the defective antenna(s), the given AP, whose test is to be performed, may be configured to transmit one or more antenna condition test frames to at least one investigator device. The antenna condition test frames may be broadcast frames such as vendor-specific action frames that are defined for vendor-specific signaling. In particular, the given AP may broadcast the antenna condition test frames using a single antenna at a time. The broadcasted antenna condition test frames may include an identity of a transmitting antenna (e.g., an antenna of the AP that transmitted a given antenna condition test frame) of the test AP. The AP may iterate through all the antennas to transmit these antenna condition test frames to the least one investigator device. A vendor-specific action frame may include fields such as a category, an organizationally unique identifier (OUI), and vendor-specific content. The field—category may specify that the frame is a vendor-specific frame. The OUI may be a number that uniquely identifies a vendor, manufacturer, or other organization. The vendor-specific content may include vendor-specific fields and information elements. In some examples, the identity of the transmitting antenna may be embedded in the vendor-specific fields.

The investigator device may receive the broadcasted antenna condition test frames and determine the conditions of the antennas of the given AP based on the antenna condition test frames received by the investigator device. For example, if a given transmitting antenna of the AP broadcasting the antenna condition test frames is defective, the investigator device may receive the antenna condition test frames transmitted by the given antenna with a reduced received signal strength indicator (RSSI) value compared to other healthy (i.e., normally operating) antennas. The investigator device may determine a condition of the transmitting antenna based on a relative comparison among the RSSI values received from several antennas of the given AP.

Figure 2:
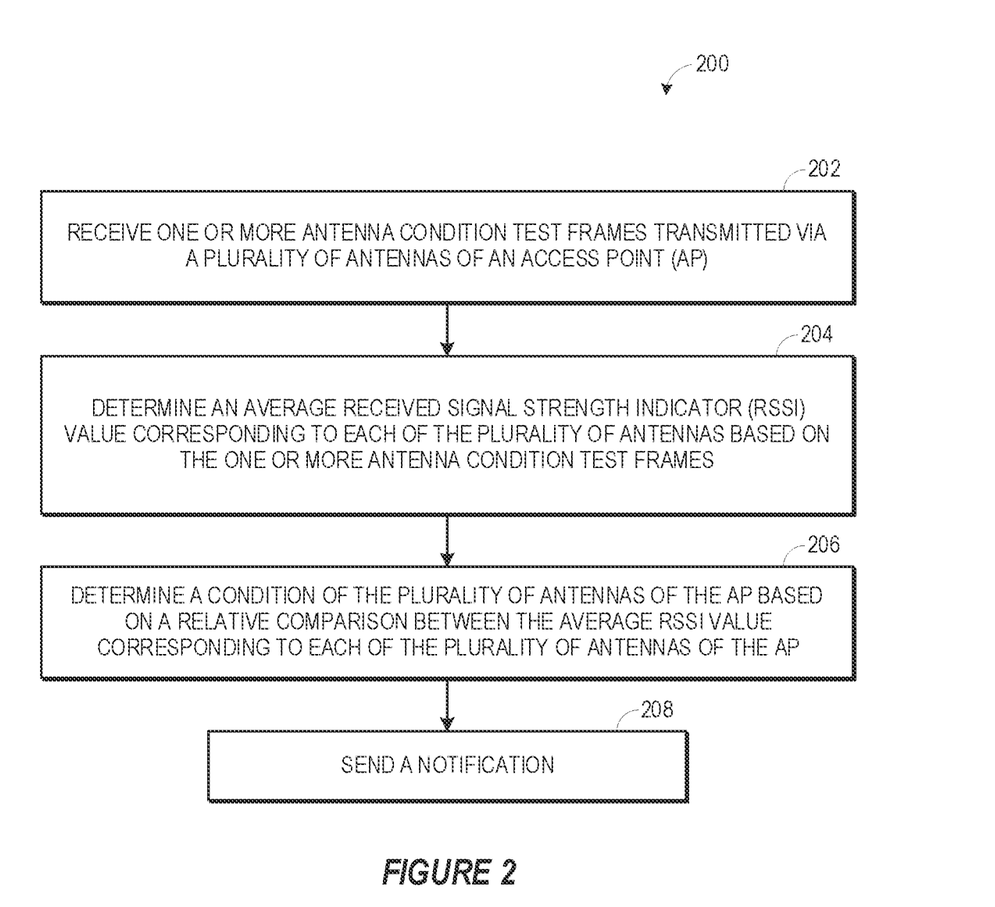
FIG. 2 depicts a flowchart of an example method for determining a condition of antennas of an AP.

Referring now to FIG. 2, a flowchart of an example method 200 for determining a condition of antennas of an AP is presented. Although the steps in FIG. 2 are shown in an order, the order of steps shown in FIG. 2 should not be construed as the only order for the steps. The steps may be performed at any time, in any order. Additionally, the steps may be repeated or omitted as needed.

In some examples, the steps shown in FIG. 2 may be performed by the investigator device(s) that is nominated for the AP In some other examples, the steps may be performed by any suitable device, such as an access point, controller, switch, computing device, a client device, network infrastructure device, etc. In some examples, the suitable device may include a hardware processing resource (not shown), such as one or more central processing units (CPUs), semiconductor-based microprocessors, and/or other hardware devices suitable for retrieval and execution of instructions stored in a machine-readable storage medium (not shown). The processing resource may fetch, decode, and execute instructions, to determining a condition of antennas of an AP. As an alternative or in addition to retrieving and executing instructions, the processing resource may include one or more electronic circuits that include electronic components for performing the functionality of one or more instructions, such as a field-programmable gate array (FPGA), application-specific integrated circuit (ASIC), or other electronic circuits.

A machine-readable storage medium, such as machine-readable storage medium, may be any electronic, magnetic, optical, or other physical storage device that contains or stores executable instructions. Thus, a machine-readable storage medium may be, for example, Random Access Memory (RAM), non-volatile RAM (NVRAM), an Electrically Erasable Programmable Read-Only Memory (EEPROM), a storage device, an optical disc, and the like. In some embodiments, a machine-readable storage medium may be a non-transitory storage medium, where the term "non-transitory" does not encompass transitory propagating signals.

At step 202, an investigator device may receive one or more antenna condition test frames transmitted via a plurality of antennas of an access point (AP) which is to be tested, hereinafter referred to as a test AP. In some examples, the investigator device may receive a plurality of antenna condition test frames from one or more of the antennas of the test AP In certain examples, the investigator device may receive a plurality of antenna condition test frames from each of the plurality of antennas of the test AP over a period. As will be understood, in some instances, over prolonged use, any physical and/or electrical damage, or due to any manufacturing defects, the investigator device may also suffer from antenna failures/defects which may cause challenges in the reception of frames by the investigator device. To overcome such challenges, the investigator device may be configured to receive each of the antenna condition test frames through several of its receiving antennas simultaneously.

Further, at step 204, the investigator device may determine an average RSSI value corresponding to each of the plurality of antennas based on the one or more antenna condition test frames. For a given transmitting antenna of the test AP, the investigator device may determine the average RSSI value based on the reception of the plurality of antenna condition test frames transmitted by the given transmitting antenna. In some examples, the investigator device may determine an RSSI value for each of the received antenna condition test frames. Then, for the given transmitting antenna, the investigator device may determine the average RSSI value as an average of the RSSI values of the antenna condition test frames received from the given transmitting antenna. For example, if eight (8) antenna condition test frames are received from the given transmitting antenna over a period, the investigator device may determine the average RSSI value for the given transmitting antenna as an average of the RSSI values of the eight antenna condition test frames that are received from the given transmitting antenna. Likewise, the investigator device may determine the average RSSI values for each of the transmitting antennas from which the investigator device has received the antenna condition test frames. Table-1 presented below depicts example data for the determination of the average RSSI values for different antennas of the test AP.

TABLE 1

Average RSSI determination example data

| | | RSSI values of antenna condition test frames | | | | | | | | Average |
|---|---|---|---|---|---|---|---|---|---|---|
| | | F1 | F2 | F3 | F4 | F5 | F6 | F7 | F8 | RSSI Value |
| Antennas | A1 | −45 | −47 | −42 | −39 | −47 | −48 | −49 | −44 | −45.13 |
| | A2 | −39 | −44 | −45 | −48 | −43 | −44 | −39 | −48 | −43.75 |
| | A3 | −65 | −70 | −68 | −75 | −73 | −75 | −78 | −74 | −72.25 |
| | A4 | −43 | −47 | −42 | −45 | −47 | −41 | −49 | −42 | −44.5 |

In the example provided in Table-1, average RSSI values for four antennas (A1, A2, A3, and A4) of the test AP are represented in the last column (i.e., the right-most column). The average RSSI Value for any antenna of the test AP is determined based on the respective eight antenna condition test frames F1, F2, F3, F4, F5, F6, F7, and F8. In the ongoing example presented in Table-1, the average RSSI values for the antennas A1, A2, A3, and A4 of the test AP are determined to be −45,13, −43.75, −72.25, and −44.5, respectively.

At block 206, the investigator device may determine a condition of the plurality of antennas of the test AP based on a relative comparison between the average RSSI values corresponding to each of the plurality of antennas of the test AP. Determining the condition of the antennas at block 206 may include performing an antenna condition test involving the relative comparison between the average RSSI values. In some examples, the investigator device may perform the antenna condition test by itself based on the average RSSI values determined by the investigator device at step 204. For example, in an implementation such as the remote sites 132, 142 having a single AP that is to be tested, the antenna condition test may be performed by the investigator device (e.g., one of the client devices communicatively coupled to the single AP). Example method steps involved in performing the antenna condition test at the investigator device are described in conjunction with FIG. 3.

Further, in some examples, determining the condition of the antennas at block 206 may include transmitting by the investigator device the average RSSI values determined at step 204 to a supervisory investigator device. The supervisory investigator device may be one among the plurality of the investigator devices defined for the test AP. In some other examples, the supervisory investigator device may be a controller. For example, in an implementation such as the primary site 102 of FIG. 1 having a plurality of APs acting as investigator devices, the controller 104 may be configured as the supervisory investigator device to perform the antenna condition test. In some examples, the supervisory device may be a computing system, for example, a computer, a controller, a router, a switch, a server, or a storage system hosted on a public cloud, a private cloud, or a hybrid cloud. In certain examples, the supervisory investigator device may be any suitable device having a hardware processing resource (not shown), such as one or more central processing units (CPUs), semiconductor-based microprocessors, and/or other hardware devices suitable for retrieval and execution of instructions stored in a machine-readable storage medium (not shown). In such implementations, all of the investigator devices may send the average RSSI values to the supervisory investigator device and the supervisory investigator device may determine the condition of the plurality of antennas of the test AP based on the relative comparison of the received average RSSI values. Example method steps involved in performing the antenna condition test at the supervisory investigator device are described in conjunction with FIG. 4.

In some examples, at block 208, the investigator device may send a notification to an administrator of the AP based on the condition of the plurality of antennas. The notification may be sent using one or more messaging techniques, including but not limited to, displaying an alert message on a display, via a text message such as a short message service (SMS), a Multimedia Messaging Service (MMS), and/or an email, via an audio alarm, video, or an audio-visual alarm, a phone call, etc. without limiting the scope of the present disclosure. For instance, if any of the antennas of the test AP is identified to be defective, the investigator device may send a notification to the controller (e.g., the controller 104) and/or a user/administrator of the test AP providing the results of the antenna condition test. In one example, at step 208, the investigator device may send the notification to the administrator of the test AP to inform that the AP has failed the antenna condition test. Accordingly, the user/administrator may consider repairing and/or replacing the test AP.

Figure 3:
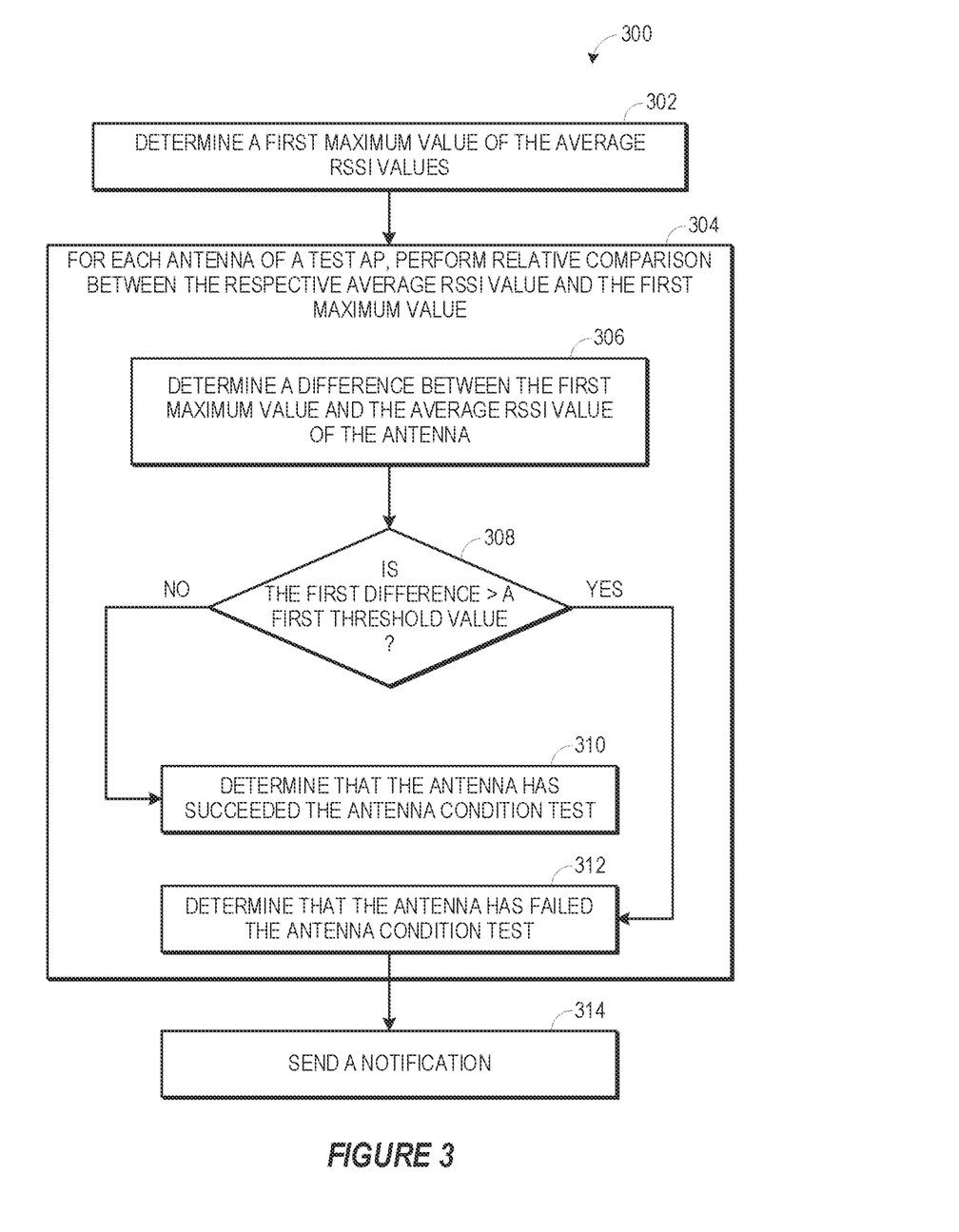
FIG. 3 depicts a flowchart of an example method of an antenna condition test in a single-AP deployment.

Referring now to FIG. 3, a flowchart of an example method 300 for an example antenna condition test is presented. The method 300 may be performed by an investigator device in single AP deployments, for example, the remote sites 132, 142 each having a single AP although it is not construed to be limited to the configuration of the single AP deployments. Accordingly, for non-limiting illustration, in the description of method 300, a test AP may be considered to be any of the APs 136, 146 of FIG. 1. Although the steps in FIG. 3 are shown in an order, the order of steps shown in FIG. 3 should not be construed as the only order for the steps. The steps may be performed at any time, in any order. Additionally, the steps may be repeated or omitted as needed. Further, the steps may be performed by the investigator device(s) that is nominated for a test AP, In some examples, the steps may be performed by any suitable device, such as an access point, controller, switch, computing device, a client device, network infrastructure device. etc. In some examples, the suitable device may include a hardware processing resource (not shown), such as one or more central processing units (CPUs), semiconductor-based microprocessors, and/or other hardware devices suitable for retrieval and execution of instructions stored in a machine-readable storage medium (not shown).

At step 302, the investigator device may determine a first maximum value of average RSSI values corresponding to each of the plurality of antennas of the test AP. As previously described, the average RSSI values are determined by the investigator device based on the antenna condition test frames received by the investigator device from the test AP. In order to determine the first maximum value of the average RSSI values, the investigator device may compare the average RSSI values with each other. In continuing the same example from FIG. 2, for the example average RSSI values depicted in the last column of Table-1, the investigator device may determine −43.75 as the first maximum value of the average RSSI values corresponding to antennas A1-A4 of the test AP.

Further, in some examples, at step 304, for each of the antennas of the test AP, the investigator device may perform a relative comparison between the respective average RSSI value and the first maximum value determined at step 302. Performing step 304 may include performing operations at steps 306 to 312. For example, for a given antenna of the test AP, at step 306 the investigator device may determine a first difference between the first maximum value (determined at step 302) and the average RSSI value corresponding to the given antenna. In one example, for the given antenna, to determine the first difference, at step 306, the investigator device may subtract the average RSSI value corresponding to the given antenna from the first maximum value (determined at step 302). In some examples, for the given antenna, the first difference may be a modulus of a number representing the difference between the first maximum value and the average RSSI value corresponding to the given antenna.

Furthermore, at step 308, the investigator device may perform a check to determine if the first difference (determined at step 306) is greater than a first threshold value. In some examples, the first threshold value may be predefined in the investigator device. In certain other examples, the first threshold value may be customizable and can be dynamically updated by an administrator and/or dynamically calculated by the investigator device. At step 308, if it is determined that the first difference is not greater than the first threshold value, the investigator device, at step 310, may determine that the antenna succeeded an antenna condition test and the antenna is working normally. However, at step 308, if it is determined that the first difference is greater than the first threshold value, at step 312, the investigator device may determine that antenna has failed the antenna condition test and the antenna is defective. The investigator device may repeat steps 306-312 for each of the antennas of the test AP.

Table-2 presented below depicts an example data that is resulted after the execution of the method 300.

TABLE 2

Example data for antenna condition test

|  |  | Average RSSI Value (A) | First Maximum Value (M1) | First Difference (D1 = M1 − A) | Is D > Th1? Th1 = 10 | Is the antenna defective? |
|---|---|---|---|---|---|---|
| Antennas | A1 | −45.13 | −43.75 | 1.38 | NO | NO |
|  | A2 | −43.75 |  | 0 | NO | NO |
|  | A3 | −72.25 |  | 28.50 | YES | YES |
|  | A4 | −44.5 |  | 0.75 | NO | NO |

In Table-2, example average RSSI values (A) corresponding to the antennas A1, A2, A3, and A4 of the test AP are −45.13, −43.75, −72.25, and −44.5, respectively, of which the first maximum value (M1) is determined as −43.75. As shown, for the antenna A3 of the test AP, the first difference (D1′ between the first maximum value (e.g., −43.75) and the average RSSI value (e.g., −72.25) of the antenna A3 is greater than the first threshold value (Th1=10). Accordingly, the investigator device may determine the antenna A3 as being defective. However, for the other antennas, such as, the antennas A1, A2, and A4, the respective first difference (D1) values are smaller than the first threshold value (Th1), and hence, the antennas A1, A2, and A4 are identified as being normally operating. In some examples, the investigator device may store information representative of the data shown in Table-2 as a result rata in a storage medium, such as, the machine-readable storage medium.

In certain examples, if any of the antennas of the test AP is identified to be defective, the investigator device may send a notification to the controller (e.g., the controller 104) and/or a user/administrator of the test AP providing the results of the antenna condition test. In one example, at step 314, the investigator device may send the notification to the administrator of the test AP to inform that the AP has failed the antenna condition test. Accordingly, the user/administrator may consider repairing and/or replacing the test AP.

Figure 4:
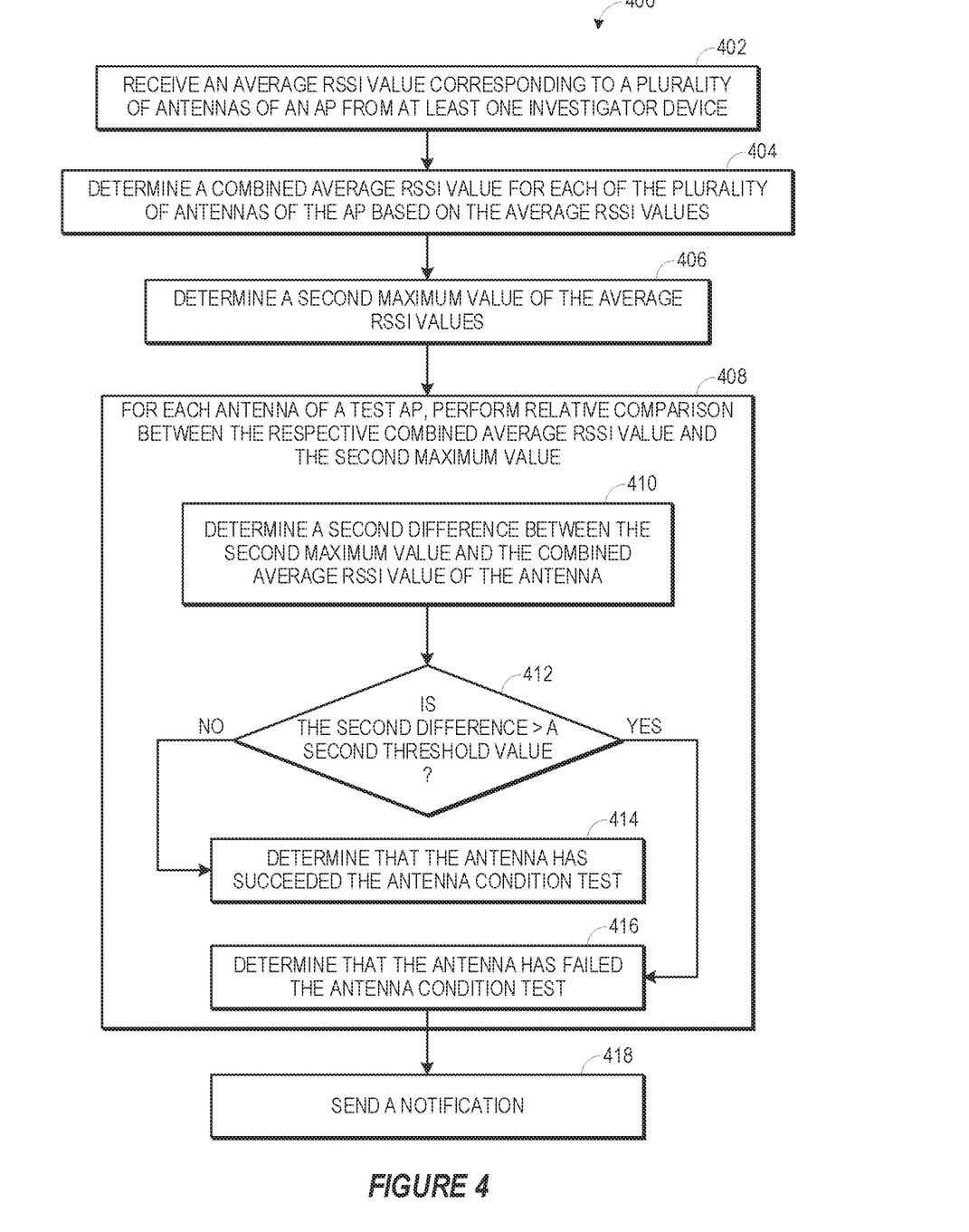
FIG. 4 depicts a flowchart of another example method of an antenna condition test in a multi-AP deployment.

Turning now to FIG. 4, a flowchart of another example method 400 of an example antenna condition test is presented. The example method 400 may be performed in multi-AP deployments, for example, a primary site 102 having multiple APs although it is not construed to be limited to the configuration of the multi-AP deployments. Accordingly, for non-limiting illustration, in the description of method 400, a test AP may be considered to be the AP 106A of FIG. 1, Further, although the steps in FIG. 4 are shown in an order, the order of steps shown in FIG. 4 should not be construed as the only order for the steps. The steps may be performed at any time, in any order. Additionally, the steps may be repeated or omitted as needed. For illustration purposes, the example method 400 is described as being performed by a supervisory investigator device. In some examples, the supervisory investigator device may be one among the plurality of the investigator devices defined for the test AP. In some other examples, the supervisory investigator device may be a controller, for example, the controller 104. In certain examples, the supervisory investigator device may be any suitable device having a hardware processing resource (not shown), such as one or more central processing units (CPUs), semiconductor-based microprocessors, and/or other hardware devices suitable for retrieval and execution of instructions stored in a machine-readable storage medium (not shown).

At step 402, the supervisory investigator device may receive an average RSSI value corresponding to a plurality of antennas of the test AP from at least one investigator device corresponding to the test AP. In an implementation where there are four investigator devices configured for monitoring the test AP, the supervisory investigator device may receive the average RSSI values corresponding to the antennas of the test AP from the four investigator devices. Table-3 presented below represents an example RSSI values of four antennas T1, T2, T3, and T4 of the test AP received by the supervisory investigator device from four investigator devices ID1, ID2, ID3, and ID4.

TABLE 3

Example data received by supervisory investigator device

|  |  | Average RSSI values received from | | | |
|---|---|---|---|---|---|
|  |  | ID1 | ID2 | ID3 | ID4 |
| Antennas of test AP | T1 | −50 | −55 | −60 | −39 |
|  | T2 | −30 | −40 | −40 | −25 |
|  | T3 | −25 | −35 | −42 | −26 |
|  | T4 | −30 | −39 | −40 | −26 |

At step 404, the supervisory investigator device may determine a combined average RSSI value for each of the plurality of antennas of the AP based on the average RSSI values received from the at least one investigator device. For a given antenna of the test AP, the combined average RSSI value may refer to an average value of the average RSSI values received from one or more of the investigator devices of the test AP Table-4 presented below shows the combined average RSSI values for the antennas T1-T4 of the test AP determined by the supervisory investigator based on the respective average RSSI values received from the investigator devices ID1-ID4.

TABLE 4

Example combined average RSSI values

| Antennas of test AP | Combined average RSSI Value (CA) |
|---|---|
| T1 | −51 |
| T2 | −33.75 |
| T3 | −32 |
| T4 | −33.75 |

The combined average RSSI values depicted in Table-4 may be determined by the supervisory investigator device based on the average RSSI values received from the investigator devices ID1-ID4. For example, for the antenna T1, an average of the values −50, −55, −60, and −39 may be determined as −51. Likewise, the supervisory investigator may determine the combined average RSSI values for the other antennas T2-T4 of the test AP based on the respective average RSSI values received from the investigator devices ID1-ID4, which are presented in Table-4.

Further, at step 406, the supervisory investigator device may determine a second maximum value of the combined average RSSI values corresponding to each of the plurality of antennas of the test AP. The term "second maximum value" refers to the maximum value of the combined average RSSI values determined at step 404. In order to determine the second maximum value of the combined average RSSI values, the supervisory investigator device may compare the combined average RSSI values with each other. In continuing the same example from Table-4, from the example combined average RSSI values, the supervisory investigator device may determine −32 as the second maximum value of the combined average RSSI values corresponding to antennas T1-T4 of the test AP.

Further, in some examples, at step 408, for each antenna of the test AP, the supervisory investigator device may perform a relative comparison between the respective combined average RSSI value and the second maximum value determined at step 406. Performing step 408 may include performing operations at steps 410 to 416. For example, for a given antenna of the test AP, at step 410 the supervisory investigator device may determine a second difference between the second maximum value (determined at step 406) and the combined average RSSI value corresponding to the given antenna. In one example, for the given antenna, to determine the second difference at step 410, the supervisory investigator device may subtract the combined average RSSI value corresponding to the given antenna from the second maximum value (determined at step 406). In some examples, for the given antenna, the second difference may be a modulus of a number representing the difference between the second maximum value and the combined average RSSI value corresponding to the given antenna.

Furthermore, at step 412, the supervisory investigator device may perform a check to determine if the second difference is greater than a second threshold value. In some examples, the second threshold value may be predefined in the supervisory investigator device. In certain other examples, the second threshold value may be customizable and can be dynamically updated by an administrator and/or dynamically calculated by the supervisory investigator device. At step 412, if it is determined that the second difference is not greater than the second threshold value, the supervisory investigator device, at step 414, may determine that the antenna has succeeded the antenna condition test and is working normally. However, at step 412, if it is determined that the second difference is greater than the second threshold value, at step 416, the supervisory investigator device may determine that antenna has failed the antenna condition test and the antenna is defective. The supervisory investigator device may repeat steps 410 to 416 for each of the antennas of the test AP.

Table-5 presented below depicts an example data that is resulted after the execution of the method 400.

TABLE 5

Example data for antenna condition test

|  |  | Combined average RSSI Value (CA) | Second Maximum Value (M2) | Second Difference (D2 = M2 − CA) | Is D > Th2? Th2 = 10 | Is antenna defective? |
| --- | --- | --- | --- | --- | --- | --- |
| Antennas | T1 | −51 | −32 | 19 | YES | YES |
|  | T2 | −33.75 |  | 1.75 | NO | NO |
|  | T3 | −32 |  | 0 | NO | NO |
|  | T4 | −33.75 |  | 1.75 | NO | NO |

In Table-5, example combined average RSSI values (CA) corresponding to the antennas T1, T2, T3, and T4 are −51, −33.75, −32, and −33.75, respectively of which the second maximum value (M2) is determined as being −32. As shown, for the antenna T1 of a test AP, the second difference (D2) between the second maximum value (e.g., −32) and the average RSSI value of the antenna T1 (e.g., −51) is greater than the second threshold value (Th2=10). Accordingly, the antenna T1 is identified as defective. However, for the other antennas, such as, the antennas T2, T3, and T4, the respective second difference (D2) values are smaller than the second threshold value (Th2), and hence, the antennas T2, T3, and T4 are identified as being normally operating. In some examples, the supervisory investigator device may store information representative of the data shown in Table-2 as a result rata in a storage medium, such as, the machine-readable storage medium.

In certain examples, if any of the antennas of the test AP is identified to be defective, the supervisory investigator device may send a notification to the controller and/or a user/administrator of the test AP providing the results of the antenna condition test. In one example, at step 418, the supervisory investigator device may send the notification to the administrator of the test AP to inform that the AP has failed the antenna condition test. Accordingly, the user/administrator may consider repairing and/or replacing the test AP.

Figure 5:
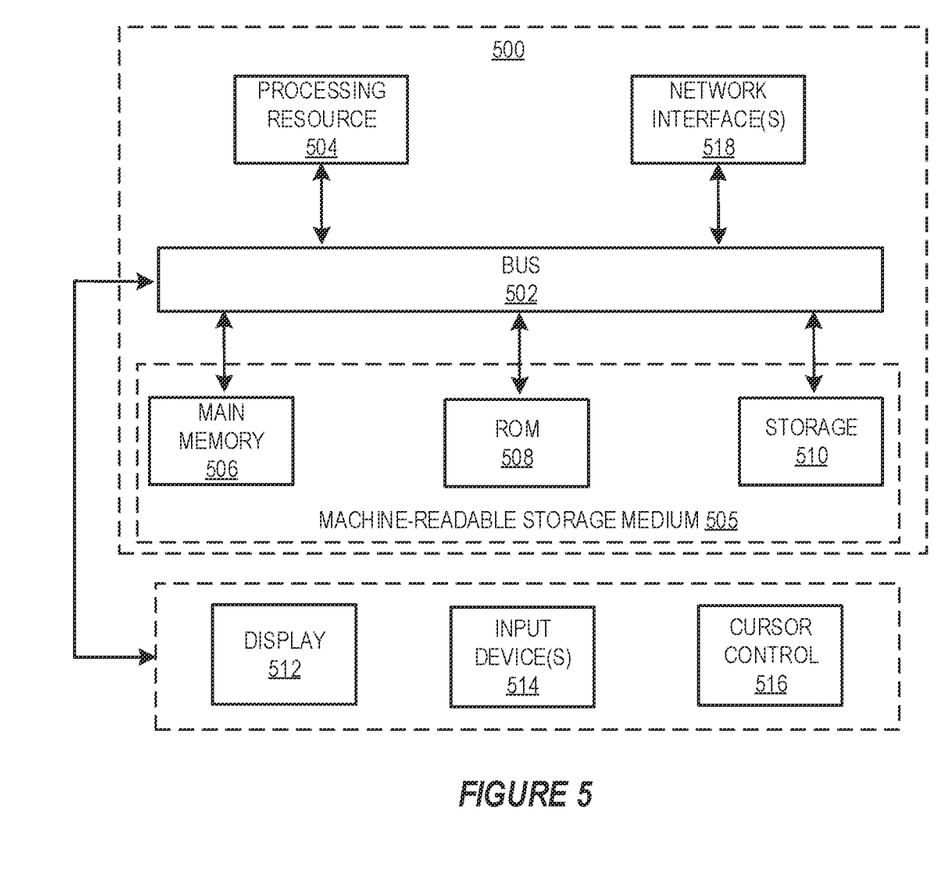
FIG. 5 depicts a block diagram of an example investigator device in which various of the examples described herein may be implemented.

FIG. 5 depicts a block diagram of an investigator device 500 in which various of the examples described herein may be implemented. The investigator device 500 may include a bus 502 or other communication mechanisms for communicating information, a hardware processor, also referred to as processing resource 504, coupled to the bus 502 for processing information. The processing resource 504 may be, for example, one or more general-purpose microprocessors.

The investigator device 500 may also include a machine-readable storage medium 505 communicatively coupled to the bus 502. In some examples, the machine-readable storage medium 505 may include a main memory 506, such as a random access memory (RAM), cache and/or other dynamic storage devices, coupled to the bus 502 for storing information and instructions to be executed by the processing resource 504. The main memory 506 may also be used for storing temporary variables or other intermediate information during the execution of instructions to be executed by the processing resource 504. Such instructions, when stored in storage media accessible to the processing resource 504, render the investigator device 500 into a special-purpose machine that is customized to perform the operations specified in the instructions.

The machine-readable storage medium 505 may further include a read-only memory (ROM) 508 or other static storage device coupled to the bus 502 for storing static information and instructions for the processing resource 504. Further, in the machine-readable storage medium 505, a storage device 510, such as a magnetic disk, optical disk, or USB thumb drive (Flash drive), etc., may be provided and coupled to the bus 502 for storing information and instructions.

Further, in some implementations, the investigator device 500 may be coupled, via the bus 502, to a display 512, such as a liquid crystal display (LCD) (or touch-sensitive screen), for displaying information to a computer user. In some examples, an input device 514, including alphanumeric and other keys (physical. or software generated and displayed on touch-sensitive screen), may be coupled to the bus 502 for communicating information and command selections to the processing resource 504. Also, in some examples, another type of user input device may be a cursor control 516, such as a mouse, a trackball, or cursor direction keys may be connected to the bus 502. The cursor control 516 may communicate direction information and command selections to the processing resource 504 for controlling cursor movement on the display 512. In some other examples, the same direction information and command selections as cursor control may be implemented via receiving touches on a touch screen without a cursor.

In some examples, the investigator device 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer-readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an erasable programmable read-only memory (EPROM). It will be further appreciated that hardware components may be comprised of connected logic units, such as gates and flip-flops, and/or may be comprised of programmable units, such as programmable gate arrays or processors.

The investigator device 500 may implement the techniques described herein using customized hard-wired logic, one or more application-specific integrated circuits (ASICs) or Field Programmable Gate Arrays (FPGAs), firmware and/or program logic which may cause or program the investigator device 500 to be a special-purpose machine. According to one example, the techniques herein are performed by the investigator device 500 in response to the processing resource 504 executing one or more sequences of one or more instructions contained in the main memory 506. Such instructions may be read into the main memory 506 from another storage medium, such as the storage device 510. Execution of the sequences of instructions contained in the main memory 506 causes the processing resource 504 to perform the process steps described herein. In an alternative example, hard-wired circuitry may be used in place of or in combination with software instructions.

The term "non-transitory media," and similar terms, as used herein refer to any media that store data and/or instructions that cause a machine to operate in a specific fashion. Such non-transitory media may include non-volatile media and/or volatile media. Non-volatile media includes, for example, optical or magnetic disks, such as the storage device 510. Volatile media may include dynamic memory, such as the main memory 506. Common forms of non-transitory media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a programmable read-only memory (PROM), and an EPROM, a FLASH-EPROM, a nonvolatile RAM (NVRAM), any other memory chip or cartridge, and networked versions of the same.

Non-transitory media is distinct from but may be used in conjunction with transmission media. Transmission media participates in transferring information between non-transitory media. For example, transmission media may include coaxial cables, copper wire, and/or fiber optics, including the wires that comprise bus 502. Transmission media can also take the form of acoustic or light waves, such as those generated during radio-wave and infra-red data communications.

The investigator device 500 also includes a network interface 518 coupled to bus 502. The network interface 518 provides a two-way data communication coupling to one or more network links that are connected to one or more local networks. For example, the network interface 518 may be an integrated services digital network (ISDN) card, cable modem, satellite modem, or a modem to provide a data communication connection to a corresponding type of telephone line. As another example, the network interface 518 may be a local area network (LAN) card to provide a data communication connection to a compatible LAN (or WAN component to communicate with a WAN). Wireless links may also be implemented. In any such implementation, the network interface 518 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic, or optical signals that carry digital data streams. The signals through the various networks and the signals on network link and through the network interface 518, which carry the digital data to and from investigator device 500, are example forms of transmission media.

The investigator device 500 can send messages and receive data, including program code, through the network(s), network link and the network interface 518. In the Internet example, a server might transmit a requested code for an application program through the Internet, the ISP, the local network, and the network interface 518. The received code may be executed by the processing resource 504 as it is received, and/or stored in the storage device 510, or other non-volatile storage for later execution.

In some examples, the machine-readable storage medium 505 (e.g., one or more of the main memory 506, the ROM 508, or the storage device 510) may store instructions which when executed by the processing resource 504 may cause the processing resource 504 to execute methods described in FIGS. 2-4. Some examples instructions which when executed by the processing resource 504 may cause the processing resource 504 to receive one or more antenna condition test frames transmitted via a plurality of antennas of an access point; determine an average received signal strength indicator (RSSI) value corresponding to each of the plurality of antennas based on the one or more antenna condition test frames; and determine a condition of the plurality of antennas of the AP based on a relative comparison between the average RSSI value corresponding to each of the plurality of antennas of the AP.

In some examples, the investigator device 500 may be operated as a supervisory investigator device. Accordingly, some of the instructions stored in the machine-readable storage medium 505 may cause the processing resource 504 to perform a method such as the method 400 described in FIG. 4. Some of the examples instructions which when executed by the processing resource 504 may cause the processing resource 504 to receive an average received signal strength indicator (RSSI) value corresponding to a plurality of antennas of an access point (AP) from at least one investigator device; determine a combined average RSSI value for each of the plurality of antennas of the AP based on the average RSSI value received from the at least one investigator device; and determine a condition of an antenna of the AP by performing a relative comparison between the combined average RSSI value for each of the plurality of antennas of the AP.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, programmable logic arrays (PLAs), Programming Array Logics (PALS), complex programmable logic devices (CPLDs), FPGAs, logical components, software routines or other mechanisms might be implemented to make up a circuit. In an implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as the investigator device 500.

As used herein, the term "or" may be construed in either an inclusive or exclusive sense. Moreover, the description of resources, operations, or structures in the singular shall not be read to exclude the plural Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, etc., may be used herein to describe various elements, these elements should not be limited by these terms, as these terms are only used to distinguish one element from another unless stated otherwise or the context indicates otherwise.

What is claimed is:

1. A method comprising:
   receiving, by at least one investigator device, one or more antenna condition test frames transmitted via a plurality of antennas of an access point (AP), wherein the at least one investigator device comprises a plurality of access points nominated for the AP, and wherein the access points are communicatively coupled to the AP over a common channel frequency;

determining, by the at least one investigator device, an average received signal strength indicator (RSSI) value corresponding to each of the plurality of antennas based on the one or more antenna condition test frames;

determining a condition of the plurality of antennas of the AP based on a relative comparison between the average RSSI value corresponding to each of the plurality of antennas of the AP; and sending, by the at least one investigator device, a notification to an administrator of the AP based on the condition of the plurality of antennas.

2. The method of claim 1, wherein the at least one investigator device comprises a client device communicatively coupled to the AP.

3. The method of claim 1, wherein the one or more antenna condition test frames comprise an identity of an antenna transmitting the one or more antenna condition test frames.

4. The method of claim 1, wherein the investigator device determines the average RSSI value corresponding to each of the plurality of antennas of the AP based on reception of the one or more antenna condition test frames through a plurality of receiving antennas of the at least one investigator device.

5. The method of claim 1, wherein determining the condition of the plurality of antennas comprises communicating, by the at least one investigator device, the average RSSI value corresponding to each of the plurality of antennas of the AP to a supervisory investigator device communicatively coupled to the at least one investigator device, wherein the supervisory investigator device is to determine the condition of the plurality of antennas of the AP based on the relative comparison of the average RSSI value corresponding to each of the plurality of antennas of the AP.

6. The method of claim 1, wherein determining the condition of the plurality of antennas comprises determining, by the at least one investigator device, a first maximum value of the average RSSI values corresponding the plurality of antennas of the AP.

7. The method of claim 6, wherein, for an antenna of the plurality of antennas of the AP, determining the condition of the plurality of antennas further comprises:

determining a first difference between the first maximum value and the average RSSI value of the antenna;

determining if the first difference is greater than a first threshold value; and in response to determining that the first difference is greater than the first threshold value, determining that the antenna has failed the antenna condition test.

8. The method of claim 7, wherein the notification is sent to inform the administrator that the AP has failed the antenna condition test in response to determining that the antenna has failed the antenna condition test.

9. An investigator device, comprising:

a processing resource; and a machine-readable storage medium accessible by the processing resource and storing executable instructions, wherein the processing resource executes the instructions to:

receiving one or more antenna condition test frames transmitted via a plurality of antennas of an access point (AP), wherein the one or more antenna condition test frames are vendor-specific action frames;

determining an average received signal strength indicator (RSSI) value corresponding to each of the plurality of antennas based on the one or more antenna condition test frames; and transmitting the average RSSI value corresponding to each of the plurality of antennas of the AP to a supervisory investigator device for the supervisory investigator device to perform an antenna condition test to determine a condition of the plurality of antennas of the AP based on a relative comparison between the average RSSI value corresponding to each of the plurality of antennas of the AP.

10. The investigator device of claim 9, wherein the one or more antenna condition test frames comprise an identity of an antenna transmitting the one or more antenna condition test frames.

11. The investigator device of claim 9, wherein the processing resource executes one or more of the instructions to determine the average RSSI value corresponding to each of the plurality of antennas of the AP based on reception of the one or more antenna condition test frames through a plurality of receiving antennas.

12. A non-transitory machine-readable medium storing instructions executable by a processing resource, the instructions, when executed by the processing resource, cause the processing resource to:

receive an average received signal strength indicator (RSSI) value corresponding to a plurality of antennas of an access point (AP) from at least one investigator device;

determine a combined average RSSI value for each of the plurality of antennas of the AP based on the average RSSI value received from the at least one investigator device;

determine a maximum value of the combined average RSSI value corresponding to each of the plurality of antennas of the AP determine a condition of an antenna of the AP by performing a relative comparison between the combined average RSSI value for each of the plurality of antennas of the AP; and send a notification to an administrator of the AP based on the condition of the antenna.

13. The non-transitory machine-readable medium of claim 12, wherein the instructions when executed by the processing resource cause the processing resource to determine a difference between the maximum value and the combined average RSSI value of the antenna.

14. The non-transitory machine-readable medium of claim 13, wherein the instructions when executed by the processing resource cause the processing resource to determine if the difference is greater than a threshold value.

15. The non-transitory machine-readable medium of claim 14, wherein the instructions when executed by the processing resource cause the processing resource to determine that the antenna has failed an antenna condition test in response to determining that the difference is greater than the threshold value.

16. The non-transitory machine-readable medium of claim 15, wherein the notification is sent to inform the administrator that the AP has failed the antenna condition test in response to determining that the antenna has failed an antenna condition test.

17. The non-transitory machine-readable medium of claim 16, wherein the instructions when executed by the processing resource cause the processing resource to determine that the antenna has succeeded an antenna condition test in response to determining that the difference is not greater than the threshold value.

\* \* \* \* \*